United States Patent Office 3,070,794
Patented Dec. 25, 1962

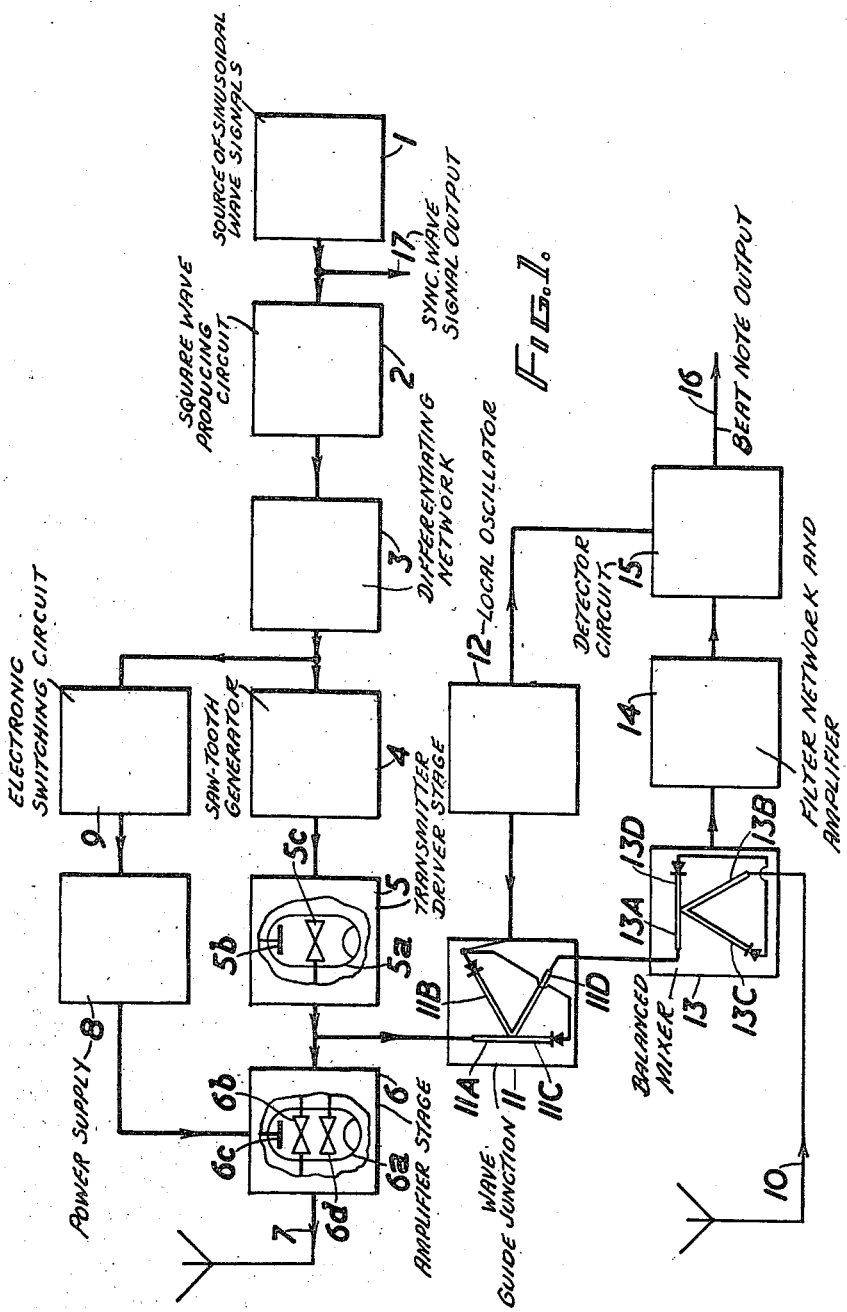

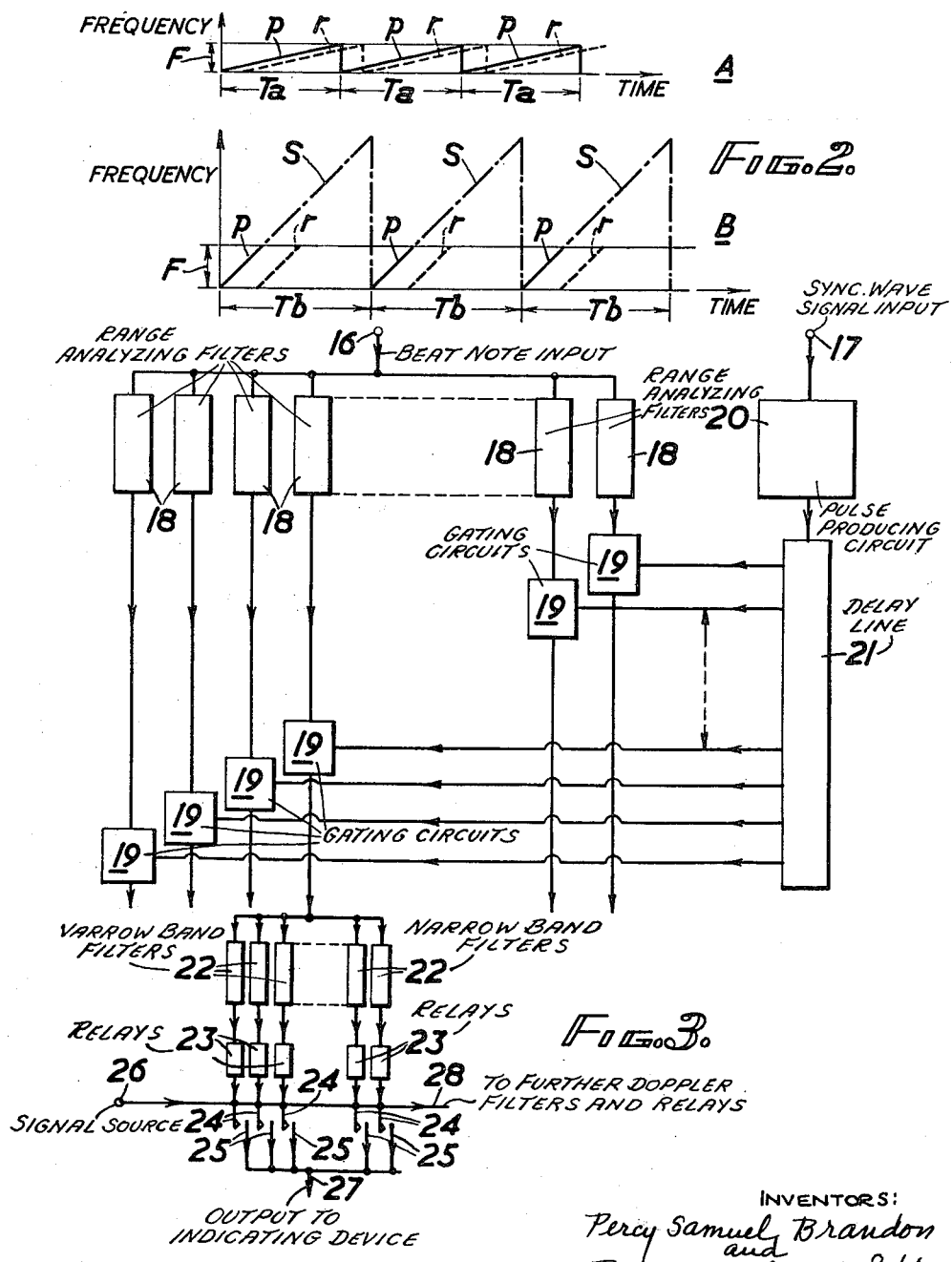

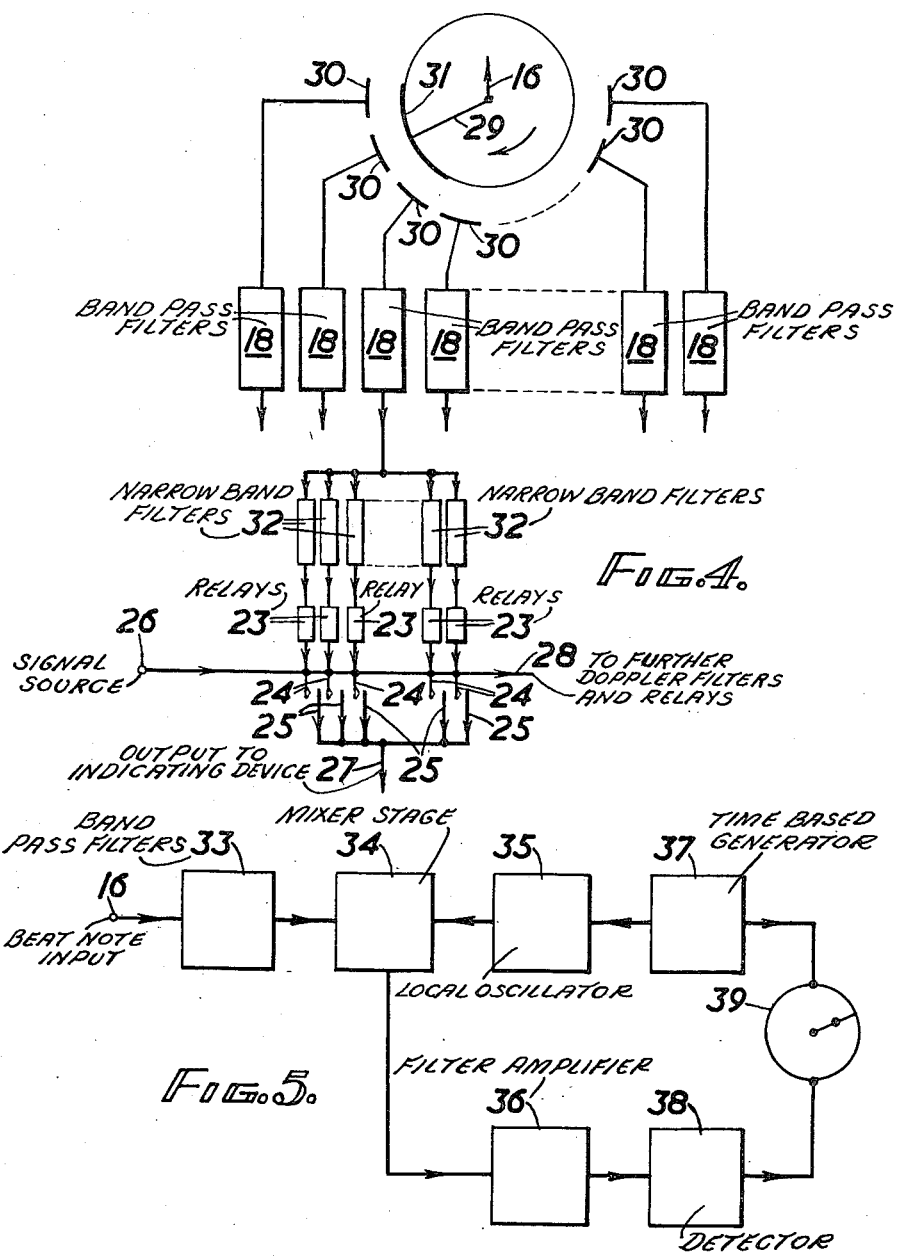

3,070,794
FREQUENCY MODULATED RADAR WITH REDUCED SCANNING TIME
Percy Samuel Brandon and Peter Maurice Wright, Essex, England, assignors to Marconi's Wireless Telegraph Company Limited, London, England, a British company
Filed Apr. 24, 1956, Ser. No. 580,392
Claims priority, application Great Britain Apr. 25, 1955
2 Claims. (Cl. 343—14)

This invention relates to radar systems and more particularly to such systems of the kind in which a frequency modulated continuous radio wave is transmitted, and the received reflected or echo wave is mixed with some of the output of the transmitter to produce beat notes from which required "target information" is obtained. For the sake of brevity radar systems of this now well-known kind will herein be referred to as frequency modulated (FM) radar systems. Such systems, of course, include those utilising frequency changes due to Doppler effect caused by target movement as well as those which do not. Throughout the specification the term "receiver" refers to those parts of the apparatus which receive an echo signal from space and produce beat notes containing radar information while the term "utilisation circuit arrangement" refers to those parts that accept beat notes from the receiver and produce signals for operating a display cathode ray tube e.g. one displaying target range computer or other utilisation device for making use of the target information obtained.

In known systems, various utilisation circuit arrangements have been developed for deriving range information from the beat note output of the detector of the receiver, two of the most common being the so-called multi-analyser system, and the sweeping spectrum analyser system.

In multi-analyser systems, detected beat notes are fed to a large number of narrow band differently tuned filters and, because the beat note frequency is dependent upon the range of the target, each filter will be appropriate to a different narrow zone of ranges and observation of which filter passes a particular beat note, enables the range of the target producing that beat note to be ascertained. Where long range targets are being investigated, however, it is often found that the beat notes have such a poor signal-to-noise ratio as to render them undetectable at the filter output which disadvantage imposes a serious limitation on this type of utilisation circuit. Theoretically this difficulty could be met, in the case of moving targets, by following each range filter by a set of narrow band, differently tuned Doppler frequency filters, each selective to a different Doppler frequency within the band of frequencies corresponding to the range of target speeds which the radar system was designed to handle. With such an arrangement output from any Doppler filter would indicate that a target was present, such target having a range within the zone of ranges covered by the range filter in question. This, however, would involve the provision of a very great number of narrow-band filters for there would have to be a set which between them covered the total band of Doppler frequencies likely to be encountered, following each range filter. Thus, for example, in the case of a long range radar dealing with high speed targets such as an arrangement would entail the use of an enormous number of filters. If the range of Dopper frequencies was 0 to 10 kc./s. and the repetition frequency of the transmitter was 20 kc./s., with a frequency deviation of 2 mc./s., one hunderd range filters would be required each having a band-width of 20 kc./s. and each feeding into 1,000 Doppler filters having bandwidths of 10 c./s (this narrow acceptance band is necessary in order to distinguish signals from noise) making a total of 100,000 Doppler filters in all. As will readily be appreciated, such arrangement is economically impracticable.

Any attempt to decrease the transmitter repetition frequency in order to enable the bandwidth of the range filters to be reduced and thereby the number of Doppler filters required to be decreased, would result in the Doppler frequencies being no longer negligible compared to the bandwidth of the range filters and thus intolerable range errors would be introduced.

Sweeping spectrums analyser systems are also limited in application due to the fact that the maximum possible rate at which a target can be scanned is limited by the repetition frequency of the transmitter. Such a limitation is a disadvantage where short ranges are involved, such as, for instance, in radar systems for use in ship docking operations. Increase of repetition frequency is limited, in its turn, by the fact that as the repetition frequency is increased the repetition period is decreased and this period must be large compared to the echo time, that is the time taken for a signal to travel to a distant target and return to the receiver. As is well known, where the repetition period is not great compared to the each time the overlap of transmitter output and received signals is small and the number of cycles of beat note produced by the signal mixing process is thus proportionately less, resulting in decreased range resolution. In any event the repetition period must be greater than twice the echo time for the most distant which the system is to handle, otherwise there will be a second series of beat notes and consequent ambiguity.

The present invention seeks to overcome the limitations of the utilisation circuits hereinbefore discussed. One important object of the invention is to enable a multi-analyser system to be used for the analysis of beat notes due to long range targets without employing an impracticable number of filters. Another important object of the invention is to enable a sweeping spectrum analyser system to present target information at high speed while still achieving a high degree of range resolution.

According to this invention in its broadest respect a frequency-modulated continuous-wave radar system includes means for generating a high radio frequency; means for cyclically and periodically varying said high radio frequency between predetermined limits of frequency; and means for transmitting only radio frequencies lying within a band of frequencies which is substantially smaller than and less within the band extending from one of said predetermined limits to the other.

Preferably the transmitting means is fed from a valve oscillator which is frequency modulated, for example in accordance with a saw tooth law, between said pre-determined limits, the channel between said oscillator and said transmitting means including an amplifier which is controlled by control means which disable it except when the frequencies of the smaller band are present.

When applied to a radar system having a utilisation circuit of the multi-analyser type, the invention presents the advantage that, because the transmitter repetition frequency can be reduced while retaining a transmitter frequency deviation normal to known FM systems for the purpose of range determination, Doppler frequencies present at the outputs of the range filters may be confined to a greatly reduced band without introducing intolerable errors or ambiguities and thus the number of Doppler filters required can be also greatly reduced.

According to one important subordinate feature of the invention a frequency-modulated continuous-wave radar system comprises means for generating a high radio-frequency; means for cyclically and periodically varying said high radio frequency between predetermined limits of frequency; means for transmitting only radio frequencies lying within a band of frequencies substantially smaller than and lying within the band extending from one of said predetermined limits to the other; means for receiving transmitted signals reflected from a distant target; means for producing beat notes of frequency dependent upon the time taken for a signal to leave the transmitter and to arrive back at the receiver; utilisation means for determining the approximate frequency of, and means for detecting the presence of, Doppler shift frequencies in said beat notes; and means, operated by signals at said Doppler frequencies, for displaying the range of a distant target.

According to another important subordinate feature of the invention a frequency modulated continuous wave radar system comprises means for generating a high radio frequency; means for cyclically and periodically varying said high radio frequency between predetermined limits of frequency; means for transmitting only radio frequencies lying within a band of frequencies susbtantially smaller than and lying within the band extending from one of said predetermined limits and the other; means for receiving transmitted signals reflected from a distant target; means for producing beat notes of frequencies dependent upon the time taken for a signal to leave the transmitter and to arrive back at the receiver; utilisation means including means for applying said beat notes, in sequence and for short periods, to frequency determining circuits such that discrete frequency components are formed; means for detecting the presence of said components; and means, operated by signals at said discrete frequencies, for displaying the range of a distant target.

When applied to a radar system having a utilisation circuit of the sweeping spectrum analyser type the invention presents the advantage that the time taken to scan a target is reduced and thus the speed of presentation of target information increased, wihout introducing ambiguity or reducing range resolution.

According to yet another important subordinate feature of the invention a frequency-modulated continuous-wave radar system comprises means for generating a high radio frequency; means for cyclically and periodically varying said high radio frequency between predetermined limits of frequency; means for transmitting only radio frequencies lying within a band of frequencies substantially smaller than and lying within the band extending from one of said predetermined limits and the other; means for receiving transmitted signals reflected from a distant target; means for producing beat notes of frequency dependent upon the time taken for a signal to leave the transmitter and to arrive back at the receiver; utilisation means including means for mixing said beat notes with a local signal having a frequency which is cyclically and periodically varied over a band of frequencies of width equal to that of the band occupied by said beat note frequencies and differing therefrom by an arbitrary frequency having a value at least that of the highest beat note frequency; amplifier means having an operating band centred about said arbitrary frequency, for amplifying and filtering the result of said mixing; means for detecting the amplified signal; a cathode ray tube adapted to give plan position indication; means for radially deflecting the beam of said tube in synchronism with the frequency variation of said local signal; and means for controlling the intensity of said beam in dependence upon the amplitude of the detected signal.

The invention is illustrated in and further described with reference to the accompanying drawings in which FIGURE 1 is a schematic block diagram of one embodiment including a conventional FM radar receiver, FIGURE 2 is an explanatory graphical figure, and FIGURES 3, 4 and 5 are examples of utilisation circuits.

Referring to FIGURE 1, the output of a source of sinusoidal wave signals 1 is connected to a square-wave producing circuit 2. The resultant square-waves are differentiated by a single differentiating network 3 and are then used to lock the frequency of operation of a sawtooth generator 4. The output from generator 4 comprises pulses having an amplitude rising linearly from zero to maximum and then dropping sharply, and substantially in zero time, back to zero. These pulses are made to modulate the frequency of a transmitter driver stage 5, comprising a reflex klystron valve 5a, oscillating at the transmission carrier frequency, by varying the voltage on reflector electrode 5b. The frequency modulated output from said reflex klystron is taken from resonator 5c and fed to the first resonator 6d of an amplifier klystron 6a, in an amplifier stage 6, where the signal is amplified and passed out, from the second resonator 6b, to a transmitting aerial 7.

Static electrode potentials applied to resonator 6b and reflector 6c, of klystron 6a, are derived from a power supply 8, which is of normal design, except in that its output is capable of being switched on and off alternately under the control of pulses produced by an electronic switching circuit 9. Said switching circuit, or pulse generator, may be any one of a number of circuits, well known per se having two distinct conditions of stability and producing a train of sharp-sided rectangular pulses at their outputs. Change of the switch from one stable condition to the other is actuated by pulses obtained from the differentiating network 3. Thus the operation of klystron 6a is intermittent and instead of a continuous radiation of energy from aerial 7, the energy is emitted in sharp bursts.

As will be appreciated from the foregoing, the band of frequencies transmitted is only a portion of the total band of frequencies generated by driver stage 5. FIGURE 2 shows two graphs of frequency (ordinates) against time (abscissae) of which graph A refers to a known FM transmitter and graph B refers to a transmitter according to the present invention. In both graphs, the full lines $p$ indicate the variation of frequency actually occurring at the transmitter aerial and the broken lines $r$ show possible frequency ranges of echo signals resulting from transmission. Lines $s$, graph B, indicate the continued variation of frequency at the transmitter driver stage, not passed on to the transmitting aerial. Time intervals $Ta$ and $Tb$ are equal to the respective periods of the transmitters and the range of frequency radiation at the transmitting aerial is shown by F. Time $Tb$ will be greater or less than $Ta$ according to the type of beat note analyser used in the radar system.

From a comparison of the two graphs it can be seen that the frequency division of the transmitter incorporating the invention is maintained at a value similar to that of a known transmitter.

In the case illustrated, transmission commences at the same time as the commencement of the frequency sweep of the driver stage and this arrangement, because of its convenience, is preferred. Also, the echoes $r$ are shown for a stationary target, but if the target has velocity, then the echo frequencies will commence either just above or just below the minimum transmitted frequencies according to the direction of target motion and due to Doppler effect.

The fraction of generated frequencies actually transmitted will depend upon the type of utilisation circuit to which the detected signals from the receiver, yet to be described, are fed, but whatever that fraction is the band of frequencies transmitted ($p$) is the band of frequencies that would normally be transmitted by a system not incorporating the present invention and the remaining frequencies ($s$) generated by the driver stage are an extension of the transmitted band of frequencies in order to obtain beat note frequencies at the receiver. Furthermore, in order to obtain comparable performance the mean power transmitted is arranged to be equal to the mean power which would be transmitted by an otherwise comparable known FM system.

In some applications where the band of frequencies to be generated by the driver stage is very wide, a reflex klystron oscillator will not operate over the required band in which case a backward travelling-wave tube oscillator, such as the type known as Carcinctron, may be employed instead in order to obtain a wider frequency range of operation.

Although a sawtooth shape of frequency-time characteristic is shown in FIGURE 2, and is in fact preferred, the invention is not limited to radar systems comprising a transmitter having such a characteristic.

Reverting to FIGURE 1, a conventional FM radar receiver is shown having an aerial 10 at which signals transmitted from aerial 7 and reflected back from a distant target are received. A four branch wave-guide junction, known as a "rat-race," 11, arranged as a mixer or biassed modulator is fed at one arm 11a with a small portion of the output available from driver stage 5 while the output of a local oscillator 12 is fed to arms 11b and 11c. The resulting signal, at arm 11d, is taken to the arm 11a of a further "rate-race" 13, which is arranged as a balanced mixer. Aerial 10 is connected to arm 13b, the output of the mixer being taken from a connection between arms 13c and 13d. Said output includes two signals at frequencies equal to the sum and difference of the frequency of oscillator 12 and beat note frequency and is passed through a filter network and amplifier 14. After amplification, the remaining signals are detected in a detector circuit 15, fed also with the output of local oscillator 12, the detected signals, appearing at the output terminal 16, being at beat note frequencies.

The beat notes available at terminal 16 will arrive in bursts, due to the switching of the transmitter, and will be at frequencies higher in order than those obtained from normal systems because of the increased rate of change of frequency of the transmitter driver stage (5 of FIGURE 1). Also, where the target has velocity the beat notes will experience a frequency shift due to Doppler effect. Various utilisation circuits may, of course, be used to obtain radar information from the beat notes but two types of circuit have been found to derive particular advantage from the mode of transmission according to the present invention, namely the multi-analyser and sweeping spectrum analyser mentioned earlier in this specificaiton, and particular arrangements of these circuits will now be described.

FIGURE 3 shows a utilisation circuit of the multi-analyser type suitable for the interpretation of beat notes containing Doppler frequencies, in which blocks 18 represent some of a series of range analysing filters, said filters being fed with beat note signals from a common input 16, corresponding to output terminal 16 of FIGURE 1. The frequency pass-band of each of the filters 18 covers a separate small section of the total band of beat note frequencies required to be received and is arranged to be equivalent (in cycles per second) to the inverse of the transmitting time (in seconds).

The outputs from the range filters are connected to gating circuits 19, of any convenient kind, which circuits are "opened" for a short period at a predetermined constant point in the transmitting modulation cycle. Controlling pulses for opening the gates are obtained, via tappings on a delay line 21, from a pulse-producing circuit 20. Said pulse producing circuit, of any convenient type well known per se, is arranged to receive a sync-wave signal from source 1 of FIGURE 1 fed in at 17, and to derive therefrom pulses suitable for "opening" gating circuits 19, said pulses being time delayed so that the gates open in sequence, one after another, once every transmitter repetition period, the time interval between the opening of adjacent gates being equal to the differences in echo-times equivalent to the ranges covered by the filters feeding them. Thus, the outputs from the gating circuits contain predominant components at Doppler frequencies and noise frequencies As is well-known the result of the gating process is that Doppler frequencies are now confined to a band-width extending from zero frequency to half the transmitter repetition frequency, and therefore relatively few narrow-band filters are required to extract Doppler frequencies from noise. Blocks 22 represent narrow-band filters, e.g. of 10 c./s. bandwidth, fed from one of the gating circuits 19, the outputs from which are connected to operate relays 23. Said relays each have one pair of contacts, 24 and 25, one of each pair, 24, being connected, in parallel, to a signal source 26 so that upon the closing of any one pair of contacts, the signal from said source is passed via output 27 to a suitable indicating device (not shown). All the other gating circuits 19 have similar Doppler filters and relays (not shown) connected to the air outputs and signal source 26 is appropriately connected at 28 to feed all of them.

In this way, although beat notes may not per se be detectable at the outputs of range filters 18, because of poor signal-to-noise ratio, it is possible to obtain an indication that beat notes have in fact passed through a particular range filter, in a simple manner involving the use of relatively few Doppler filters. Furthermore, as range filter band-width has been preserved intolerable range errors are not produced by Doppler frequencies present in the beat notes.

An alternative arrangement of a multi-analyser utilisation circuit is shown in FIG. 4 and depends for its action upon the fact that several beat note bursts superimposed one upon the other is, say, a range filter circuit, tend to divide out into a number of components at discrete frequencies occurring at multiples of the transmitter repetition frequency and confined within the frequency spectrum envelope of a single beat note burst. If said discrete frequency components are fed to narrow-band filters of appropriate mid-frequency, they will pass through, substantially to the exlusion of noise, indicating that a beat note burst containing those frequencies has been produced at the appropriate range filter output and thereby giving the range of the target concerned.

Referring to FIG. 4, the rotating element 29 of a rotary capacity switch is rotated, by means not shown, at an angular velocity equivalent to the repetition frequency of the transmitter, past a series of corresponding static elements 30, to each of which is connected a band-pass filter 18, similar to filters 18 of FIG. 3. Said static elements are so positioned inter se that the beat notes representing a particular range are fed to the filter corresponding to that range. The "wiper" 31 of said rotary element, to which is fed the receiver beat note output from 16 of FIG. 1, is so dimensioned with respect to the static elements that more than one filter is connected to terminal 16 at any one moment. In the arrangement shown, only two filters are connected at any one moment although, in practice, the number will be greater than this as a filter must be in circuit for a time equal to its "build up" time, i.e. the time period equivalent to its frequency band width.

The outputs from filters 18, containing the aforementioned discrete frequency components and noise, are taken each to a separate block of narrow-band filters 32, one block of which is shown and which, as it is only required to filter the discrete frequency components from noise without determining the actual frequencies of said components, can have a total band-width equivalent to the band-width from zero to half the transmitter repetition frequency. However, in this arrangement, differing from that of FIG. 3, the total frequency bands of each of the blocks of filters 32 connected to each of the range filters 18 do not cover the same band of frequencies but are centred round the mid-frequency of the appropriate range filter. E.g. if the transmitter repetition frequency is 100 c./s. then the total band-width of each block of filters 32 will be 50 c./s. Therefore, if range filters 18 each cover a band of 10 kc./s. in a total frequency range of 10 kc./s. to 2 mc./s. then the frequency band of the first block of narrow-band filters will be 9,975 kc./s. to 10,025 kc./s. and of the last block will be 1,999,975 mc./s. to 2,000,025 mc./s.

The output of filters 32 are connected to operate relays 23 and thereby produce a signal at output 27, in a similar manner to that explained with reference to FIG. 3.

A utilisation circuit of the sweeping spectrum analyser type, well known per se but described here for the sake of completeness, is shown in FIG. 5, in which beat note signals, from output 16 (FIG. 1) of the receiver, are passed through a band-pass filter 33 which passes only those beat note frequencies lying within the range of interest. The filtered beat notes are then fed to a mixer stage 34 where they are heterodyned with the output of a so-called "sweeping" local oscillator 35, the resulting signal being passed to a filter amplifier 36 whose mid-frequency is chosen to be well outside the relevant beat note frequency band and whose band-width is equal to the transmitter repetition frequency. Said local oscillator has the frequency of its output varied at a constant rate in dependence upon the sawtooth voltage output of a time based generator 37 e.g. by applying said sawtooth voltage to a reactance valve connected across the tuned circuit of the oscillator. The frequency swing of said oscillator is arranged to extend from a minimum value equal to the sum of the mid-frequency of amplifier 36 and the minimum beat note frequency to a maximum value equal to the sum of the mid-frequency of amplifier 36 and the maximum accepted beat note frequency.

The output from amplifier 36 is connected to a detector 38 and detected signals are used to modulate the spot brightness on the screen of a cathode ray tube 39 adapted to give plan position indication (means for obtaining azimuth indication are not shown). Radial deflection of said spot is controlled by the sawtooth output of time-base generator 37 having a rate of change of amplitude with time proportional to the product of the reciprocal of the transmitting time and the transmitter repetition frequency. Clearly, this product is equal to the rate of change of frequency at the output of local oscillator 35.

In a radar system using such a utilisation circuit, the transmitter repetition frequency is increased with respect to that of an otherwise comparable known transmitter while the transmitting time and range of frequencies transmitted are kept at normal values, resulting in beat notes being received in bursts instead of continuously. Due to these factors, information is obtained in a greatly reduced time. E.g. if a transmitter has a repetition frequency of 10 kc./s. and 10% of the frequency band generated by the transmitter driver stage is actually transmitted then the rate of change of local oscillator frequency will be 1,000 mc./s./s. Taking the range of interesting beat notes to cover 20 mc./s., then the time taken to investigate all relevant ranges, in a particular direction, will be 20 mc./s.–1,000 mc./s./s., i.e. 0.02 second.

In a system not in accordance with the present invention and in which beat notes are produced continuously, the time taken to carry out the above investigation would be multiplied ten times, i.e. 0.2 second. Furthermore, because of the large frequency deviation of the transmitter driver stage compared to the frequency deviation of the transmitted signal, which ensures that overlap of transmitter output and received echo-signal is sufficient to produce a beat note burst of desirable length, the range resolution of the system is maintained and ambiguity avoided.

We claim:

1. A frequency modulated continuous wave radar transmitting and receiving system comprising in combination a radio frequency generator, means for frequency modulating said generator in accordance with a predetermined law between predetermined limits, between which limits is a smaller band of frequencies, the channel between said generator and said transmitter means including an amplifier which is controlled by control means which disable said channel except when the frequencies of the smaller band are present whereby radiation is prevented except of frequencies lying within said smaller band; a receiver for receiving the transmitted signals reflected from a distant target, said receiver being also fed with energy from said radio frequency generator over a substantially greater range of frequencies than the transmitted band, a local oscillator, a first mixer fed with energy at said greater range of frequencies and with energy from said local oscillator, a second mixer fed with energy from said first mixer and with received reflected signals, a detector, means for feeding the output from said second mixer and from said local oscillator to said detector whereby there are produced beat notes of frequency dependent upon the time taken for a signal to leave the transmitter and to arrive back at the receiver; utilisation means; and means for separating the beat notes and applying these to said utilisation means, said utilisation means including means for determining the approximate frequency of, and means for detecting the presence of, Doppler shift frequencies in said beat notes, and means, operated by signals at said Doppler frequencies, for displaying the range of a distant target.

2. A frequency modulated continuous wave transmitting and receiving radar system comprising in combination a radio frequency generator, means for frequency modulating said generator in accordance with a predetermined law between predetermined limits, between which limits is a smaller band of frequencies, the channel between said generator and said transmitting means including an amplifier which is controlled by control means which disable said channel except when the frequencies of the smaller band are present whereby radiation is prevented except of frequencies lying within said smaller band of frequencies substantially smaller than and lying within the band extending from one of said predetermined limits to the other; a receiver for receiving the transmitted signals reflected from a distant target, said receiver being also fed with energy from said radio frequency generator over a substantially greater range of frequencies than the transmitted band, a local oscillator, a first mixer fed with energy at said greater range of frequencies and with energy from said local oscillator, a second mixer fed with energy from said first mixer and with received reflected signals, a detector, means for feeding the output from said second mixer and from said local oscillator to said detector whereby there are produced beat notes of frequency dependent upon the time taken for a signal to leave the transmitter and to arrive back at the receiver; utilisation means; means for separating the beat notes and applying them to said utilisation means, said utilisation means including frequency determining circuits, means for applying said beat notes in sequence and for short periods to said frequency determining circuits to form discrete frequency components; means for detecting the presence of said components; and means, operated by signals at said discrete frequencies, for displaying the range of a distant target.

References Cited in the file of this patent

UNITED STATES PATENTS

| | | |
|---|---|---|
| 2,436,672 | Sanders | Feb. 24, 1948 |
| 2,522,367 | Guanella | Sept. 12, 1950 |
| 2,540,089 | Barker | Feb. 6, 1951 |
| 2,557,864 | Doremus | June 19, 1951 |
| 2,602,920 | Rust et al. | July 8, 1952 |
| 2,659,878 | Meeker et al. | Nov. 17, 1953 |

FOREIGN PATENTS

| | | |
|---|---|---|
| 149,059 | Australia | Nov. 18, 1952 |
| 149,060 | Australia | Nov. 18, 1952 |
| 149,061 | Australia | Nov. 18, 1952 |